United States Patent
Poechmueller

(10) Patent No.: US 7,359,259 B2
(45) Date of Patent: Apr. 15, 2008

(54) METHOD FOR TRANSMISSION AND RECEPTION OF A DATA SIGNAL ON A LINE PAIR, AS WELL AS A TRANSMISSION AND RECEPTION CIRCUIT FOR THIS PURPOSE

(75) Inventor: Peter Poechmueller, Dresden (DE)

(73) Assignee: Infineon Technologies AG, Munich (DE)

( * ) Notice: Subject to any disclaimer, the term of this patent is extended or adjusted under 35 U.S.C. 154(b) by 236 days.

(21) Appl. No.: 11/284,139

(22) Filed: Nov. 21, 2005

(65) Prior Publication Data

US 2006/0133159 A1 Jun. 22, 2006

(30) Foreign Application Priority Data

Nov. 19, 2004 (DE) .................. 10 2004 055 859

(51) Int. Cl.
*G11C 7/00* (2006.01)
(52) U.S. Cl. .................. 365/198; 375/219; 375/222; 375/257; 375/288; 375/295; 375/340
(58) Field of Classification Search ............... 375/219, 375/222, 257, 288, 295, 340; 365/198
See application file for complete search history.

(56) References Cited

U.S. PATENT DOCUMENTS

| 6,424,177 | B1 | 7/2002 | Hairapetian |
| 6,542,552 | B1 * | 4/2003 | Yoshikawa et al. ......... 375/257 |
| 6,628,721 | B1 | 9/2003 | Fischer |
| 2003/0043935 | A1 | 3/2003 | Noh |
| 2005/0018761 | A1 * | 1/2005 | Jex et al. .................. 375/219 |

FOREIGN PATENT DOCUMENTS

DE 10238494 A1 4/2003

OTHER PUBLICATIONS

German Patent Office Examination Report dated Sep. 12, 2005.

* cited by examiner

*Primary Examiner*—VanThu Nguyen
(74) *Attorney, Agent, or Firm*—Patterson & Sheridan, L.L.P.

(57) ABSTRACT

Apparatuses and methods for transmitting and receiving a data signal on a line pair having a first transmission line and a second transmission line are provided. In one embodiment, a data signal which represents the data to be transmitted by means of a sequence of first and second signal levels is applied to the first transmission line, and a reference signal which changes between a first and a second reference level only when a level change between the first and the second signal level is suppressed between two successive signal levels of the data signal on the first transmission line is applied to the second transmission line.

11 Claims, 4 Drawing Sheets

METHOD FOR TRANSMISSION AND RECEPTION OF A DATA SIGNAL ON A LINE PAIR, AS WELL AS A TRANSMISSION AND RECEPTION CIRCUIT FOR THIS PURPOSE

CROSS-REFERENCE TO RELATED APPLICATIONS

This application claims foreign priority benefits under 35 U.S.C. §119 to co-pending German patent application number DE 10 2004 055 859.0, filed 19 Nov. 2004. This related patent application is herein incorporated by reference in its entirety.

BACKGROUND OF THE INVENTION

1. Field of the Invention

The invention relates to a method for transmission of a data signal on a line pair, and to a method for reception of the data signal.

2. Description of the Related Art

The invention relates to a method for transmission of a data signal on a line pair, and to a method for reception of the data signal. The invention also relates to a transmission circuit for transmission of a data signal via a line pair, and to a reception circuit for reception of the data signal.

By way of example, the transmission of data to the memory circuit and from the memory circuit in present-day dynamic random access memory (DRAM) memory circuits represents the greatest bottleneck for data in computer systems, since the data transmission rates are not adequate for the data requirement of a CPU. In order to solve the problem of a restricted data transmission rate between a memory module and, for example, a memory controller which is driving it, synchronous DRAM memory circuits were initially used, in which the data was transmitted in synchronism with the a clock signal. In consequence, the data rates could be increased from the previous 50 MHz to about 133 MHz. Next, double data rate (DDR) interfaces were introduced, and raised the transmission rates to the region of 400 MHz. DDR 2 technology (approximately 533 MHz) is currently being introduced to the market. In the meantime, however, the processing speed of the processors has also increased considerably, so that the gap between the data requirement for the processor and the data rate at which data can be transmitted from and to the memory module has in fact increased rather than decreased.

In order to increase the data rates, the transmission frequency must be increased, so that the signal transmission is more sensitive to external interference, and is thus less reliable. In consequence, synchronous transmission of data is still difficult. In particular, the synchronization of the data to a data bus to which the memory module is connected to one or more clock signals is problematic owing to the different signal delay times on the bus lines, as the transmission frequency increases.

At higher transmission frequencies, the data signals are also more susceptible to interference and influence one another, in particular by signal crosstalk.

SUMMARY OF THE INVENTION

One object of the present invention is thus to provide a method for transmission and reception of a data signal, by means of which a data signal can be produced and received reliably at a very high transmission rate, and in which case the transmission of the data signal is less susceptible to interference.

A further object of the present invention is to provide a transmission circuit and a reception circuit for transmission and reception, respectively, of a data signal at a high transmission rate, but in which no synchronization problems occur.

A further object of the present invention is to provide an integrated memory circuit, which can produce data with a parallelity of a plurality of bits at a high data rate, and can produce this for storage in the memory circuit.

According to a first aspect of the present invention, a method is provided for transmission of data on a line pair having a first transmission line and having a second transmission line. A data signal which represents the data to be transmitted by means of a sequence of first and second signal levels is applied to the first transmission line. A reference signal which changes between a first and a second reference level only when a level change between the first and the second signal level is suppressed between two successive signal levels of the data signal on the first transmission line is applied to the second transmission line.

The method for transmission of a data signal has the advantage that the interference sensitivity of differential signal transmission is possible with the capability for simultaneous provision of clock information which is associated with the data signal to be transmitted, in order to make it possible to transfer a transmitted data signal, for example in a latch, via the line pair. Differential signal transmission generally takes place on a line pair whose lines are routed essentially parallel to one another and at a short distance apart, so that externally injected interference acts equally on the voltage levels on both transmission lines of the line pair. Since the data item to be transmitted is normally determined by the potential difference between the transmission lines, this potential difference is not influenced by the interference signal. At the same time, the transmission lines are used to transmit clock information at the same time as the data item, and the data signal is synchronized to this clock information.

This is done by applying the signal levels of the data signal which represent the data to be transmitted successively to the first transmission line. In order to identify two successive data bits even when there is no level change between two successive data bits of the data signal, a reference signal which has a transition between a first and a second reference level is applied to the second transmission line in this case. This means that the clock information is produced by the data signal or the reference signal. Since the reference signal has a level change only when two successive signal levels of the data signal are the same, this at the same time avoids the need to provide more level transitions of the reference level of the reference signal. This is possible because the data signal already contains the clock information for transferring the transmitted data item when a level change takes place in the signal level of the data signal.

The potentials of the first and second signal levels of the data signal and the potentials of the first and second reference levels of the reference signal are preferably different, so that an association can be created with the transmitted data bit by evaluation of the potential difference between the respective signal level of the data signal and the respective reference level of the reference signal.

The potential of the first signal level of the data signal is preferably lower than the potentials of the first and second reference levels of the reference signal, and additionally or alternatively, or the potential of the second signal level of the data signal is higher than the potentials of the first and second reference levels of the reference signal. The mathematical sign of the potential difference between the data signal and the reference signal on the line pair can thus be used to interpret the transmitted data item.

According to a further aspect of the present invention, a method is provided for reception of data via a line pair having a first transmission line and a second transmission line. A data signal which represents the data to be transmitted by a sequence of first and second signal levels is received on the first transmission line. A reference signal at a first and a second reference level is received on the second transmission line with a data item which is transmitted by the data signal being defined as a function of the difference between the applied signal level of the data signal and the applied reference level. The data item is produced as a valid data item as a function of a level change occurring between the signal levels of the data signal and a level change occurring between the reference levels of the reference signal.

The method for reception of the data signal has the advantage that it is possible to receive via a differential line pair with two transmission lines not only a data signal which is more robust to external interference influences, but also clock information which is transmitted at the same time and by means of which the data can be transferred. In consequence, there is no need to synchronize the transmitted data to a clock signal which must likewise be provided, and this avoids one disadvantage which results from different signal delay times of the data signals and of one or more clock signals. While the data signal is transmitted on the first transmission line with respect to the reference signal, a clock edge of the clock signal is produced either on the basis of a level change on the first transmission line or on the basis of a level change of the reference signal on the second transmission line.

The level change is preferably used to produce that data item which was received immediately before the level change. Alternatively, the level change can be used to produce as valid that data item which is received immediately after the level change.

According to a further aspect of the present invention, a transmission circuit is provided for transmission of a data signal on a line pair having a first transmission line and a second transmission line. The transmission circuit has a first driver circuit which applies a data signal to the first transmission line, wherein the data signal represents the data to be transmitted by means of a sequence of first and second signal levels. The transmission circuit has a second driver circuit which applies a reference signal, which has a first and a second reference level, to the second transmission line. A control unit is provided, which drives the second driver circuit such that the reference signal changes between a first and a second reference level only when a level change between the first and the second signal level is suppressed between two successive data items when the data signal is applied to the first transmission line.

The transmission circuit according to the invention has the advantage that it allows the transmission of a data signal in a differential form on the line pair, while at the same time transmitting clock information on the line pair, to which the data signal is synchronized and which can be used to transfer the data signal.

The first driver circuit is preferably provided such that the data signal is applied to the first transmission line with potentials of the first signal level and of the second signal level of the data signal. The second driver circuit is provided such that the reference signal is applied to the second transmission line with potentials of the first reference level and of the second reference level of the reference signal. The potentials of the first and second reference levels of the reference signal are different than the potentials of the first and of the second signal levels.

The control unit can be designed such that it receives a data output signal, which represents the data to be transmitted, and clock information, and such that it drives the first driver circuit as a function of the data output signal, with the control unit driving the second driver circuit in order to produce a level change of the reference signal only when the signal level of the data signal has the same signal level as the previous signal level.

According to a further aspect of the present invention, a reception circuit is provided for reception of a data signal via a line pair having a first transmission line and a second transmission line. The reception circuit has a first input circuit which can be connected to the first transmission line in order to receive a data signal which represents the data to be transmitted by means of a sequence of first and second signal levels. The reception circuit also has a second input circuit which can be connected to the second transmission line in order to receive a reference signal. The reception circuit furthermore has an evaluation circuit, which determines a data item of the data signal as a function of the difference between the applied signal level of the data signal and the applied reference signal, and produces the data item as a valid data item as a function of a level change occurring between the signal levels of the data signal or between the reference levels of the reference signal.

The reception circuit according to the invention has the advantage that a data signal can be received which is transmitted differentially on a line pair, with clock information being transmitted on the line pair at the same time as the data signal.

The reception circuit can be provided with a first edge detector unit and an edge detector unit in order to, in each case, generate a clock pulse as a function of a level transition of the reference signal and of the data signal.

According to one embodiment, it is possible to provide for the evaluation circuit to have an output latch in order to transfer the data signal to the output latch as a function of the clock signal.

Furthermore, the read circuit can be provided in order to transfer that data item which was determined immediately before the edge to the output latch in response to an edge of the clock signal. For this purpose, the evaluation circuit may have a delay element, which is connected to the first input circuit in order to delay the data signal with respect to the edge of the clock signal.

According to a further embodiment, the evaluation circuit can be provided such that the data item which is determined immediately after the edge of the clock signal is transferred to the output latch in response to an edge of the clock signal. For this purpose, the evaluation circuit may have a delay element which is connected to the clock generation unit in order to delay the clock signal with respect to the data signal.

According to a further aspect of the present invention, an integrated memory circuit having a plurality of reception circuits is provided. The evaluation circuits of the plurality of reception circuits each have an output latch in which the data to be received can be temporarily stored. Furthermore, a reception monitoring unit is provided in order to generate a valid signal when each of the output latches has received a data item.

This makes it possible to receive data in an integrated memory circuit asynchronously and to produce this data from the memory circuit once it has been received completely, as is indicated by the valid signal. In particular, the reception monitoring unit may have a wide latch for each evaluation circuit, in order to store the occurrence of a level change between the signal levels of the data signal or between the reference levels of the reference signal in which case, in the situation in which each latch is storing a level change that has occurred, since the reception monitoring unit emits the valid signal. This represents a particularly simple manner for generation of the valid signal.

According to one embodiment, it is possible to provide for the reception monitoring unit to reset the wide latch once the data has been read, in order to allow reception of subsequent data.

It is possible to provide for a number of output latches to be provided in each evaluation circuit which is provided in the buffer store as a first-in-first-out memory, in order to temporarily store a number of successive data items.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The invention relates in general to the transmission of a data signal with associated clock information on a differential line pair. In this case, signal interference which is acting equally on the transmission lines in the line pair can be eliminated by forming the difference between the signal levels on the two transmission lines. Clock information is transmitted at the same time via the two transmission lines by using a signal edge of one of the two transmission lines to produce a clock edge for transfer of the data signal.

Figure 1:
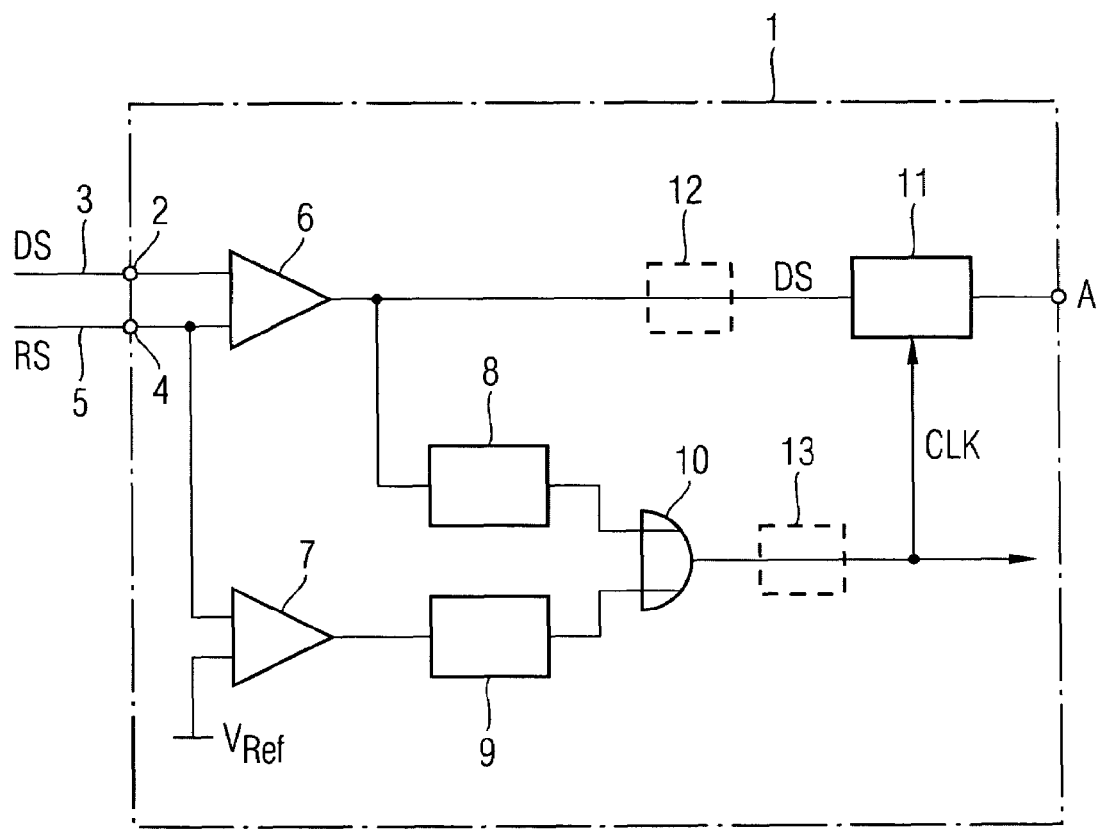
FIG. 1 shows a block diagram of a reception circuit according to one embodiment of the invention.

By way of example, the reception circuit 1 shown in FIG. 1 can be used for reception of a signal which is then transmitted via a line pair in this way. The reception circuit 1 has a first signal input 2 for connection to a first transmission line 3, and a second signal input 4 for connection to a second transmission line 5. The first and second transmission lines 3, 5 are, for example, conductors of a line pair and are preferably routed parallel and/or closely adjacent to one another, so that any interference which occurs is evident in equal fluctuations in the signal level on the two transmission lines 3, 5. One example of a line pair such as this is a twisted-pair line, in which the transmission lines are twisted around one another.

As shown in FIG. 1, the first transmission line 3 is connected via the first signal input 2 to a first connection of a first input circuit 6, in order to receive a data signal DS. The second transmission line 5 is connected via the second signal input to a second connection of the first input circuit 6, in order to receive the reference signal RS.

The first input circuit 6 is preferably an operational amplifier or a differential amplifier, and emits at its output a signal with a first state or a second state depending on the potential difference between the signal levels applied to the first and second transmission lines 3, 5. In the case of an operational amplifier, the first and second states at the output of the operational amplifier correspond, for example, to a positive and negative supply voltage with which the operational amplifier 6 is operated. The first and the second state at the output of the first reception circuit correspond to logic signal levels which can be detected by the units that are connected to the output of the first input circuit.

The second transmission line 5 is connected via the second input 4 to a second input circuit 7, which may likewise be an operational amplifier, a differential amplifier or the like. A second connection of the second input circuit 7 is connected to a reference voltage $V_{Ref}$, thus indicating that a defined level change of the reference signal RS can be found on the second transmission line 5.

The output of the first input circuit 6 is connected to a first edge detector 8, and an output of the second input circuit 7 is connected to a second edge detector 9. The edge detectors are used to detect a level change at the output of the first and second input circuits 6, 7, and to generate a clock pulse signal at their outputs when a level change is identified. The clock pulse signal may, for example, be a pulse with a defined time duration, and is generated in both directions when a level change occurs.

Outputs from the first and second edge detectors 8, 9 are connected to an OR gate 10, at whose output the clock signal which has been reconstructed from the signals on the first and second transmission lines 5 is produced. The clock signal is essentially the superimposition of the clock pulse signals which are produced by the first and second edge detector units. The output of the first input circuit 6 is connected to a latch 11, to which the data signal DS which is produced at the output of the first input circuit 6 is transferred with the aid of the clock signal which has been reconstructed at the output of the OR gate 10. The data signal which is stored in the latch 11 can thus be provided for a downstream circuit.

The first input circuit 6 is essentially used to define and to provide the data signal as a function of the mathematical sign of the potential difference between a signal level of a data signal DS on the first transmission line 3 and a reference level of a reference signal RS on the second transmission line 5.

The reference signal RS, which has an edge between a first and a second reference level, at least when the signal level of the data signal DS which is transmitted on the first transmission line 3 does not change, is applied to the second transmission line 5. A level change of the reference signal on the second transmission line 5 can admittedly also be generated when a signal edge occurs in the data signal on the first transmission line 3, but this represents a greater load on a corresponding transmission circuit, and increases the interference influence on the transmission lines 3, 5 because of signal crosstalk effects between the transmission line signals and because of the increased number of edges that occur.

The potentials of the signal levels of the data signal DS on the first transmission line 3 and the reference signal RS on the second transmission line 5 are preferably chosen such that the data signal can be detected reliably with the aid of the first input circuit 6 on the basis of the mathematical sign of the potential difference between the first and second transmission lines 3, 5. In order to ensure this, the signal levels of the data signal and of the reference signal are preferably chosen such that the potential of a first low signal level of the data signal DS is lower than the first and the second reference level of the reference signal RS, and the potential of a second, higher signal level of the data signal DS is higher than the potentials of the first and second reference levels of the reference signal RS. In particular, care should be taken to ensure that the potential difference between the potential of the first (low) signal level and of the lower of the two reference levels as well as the potential difference between the second (high) signal level and the higher of the two reference levels of the reference signal are sufficiently large, respectively, in order to allow reliable detection by the first input circuit 6.

The reference potential $V_{Ref}$ which is applied to the second connection of the second input circuit 7 preferably corresponds to a potential between the first and the second reference level of the reference signal, so that a second input circuit, which is in the form of an operational amplifier, detects the mathematical sign of the potential difference between the reference level and the reference potential. In particular, the reference potential should be approximately at the midpoint between the first and second reference levels of the reference signal RS. Furthermore, the reference signal RS, the data signal DS and the reference potential $V_{Ref}$ should be chosen such that the reference potential $V_{Ref}$ is likewise between the first and second signal levels of the data signal, preferably at the midpoint between the first and second signal levels.

Level transitions of the data signal DS and level transitions of the reference signal RS are determined by means of the edge detector units 8, 9 in order to detect a clock edge that has occurred. If one of the two edge detector units 8, 9 detects a level change, then this is passed on by a clock pulse to an OR gate 10, so that a clock pulse is emitted from the output of the OR gate 10 whenever one of the two edge detector units 8, 9 has detected a level change. The clock pulse is used to transfer the data signal that has been applied to the latch 11 to the latch and to produce this at its output A, that is to say, the output of the reception circuit 1.

In order to synchronize the data signal DS and the clock signal CLK to one another, and in order to comply with the set-up and hold times of the latch 11, a delay element 12 can alternatively be connected upstream of the input of the latch 11 for the data signal DS. In this case, the data signal is transferred to the latch 11 by that clock edge of the clock signal which terminates the time window of the corresponding data bit. Alternatively, a further delay element 13 can be provided at the output of the OR gate 10 in order to delay the clock pulse, so that the clock edge which was detected at the start of the received data bit is used to transfer the data bit to the latch 11. The further delay element 13 is then provided such that the transferring edge of the clock pulse is produced following the set-up time of the latch 13 after the application of the data signal DS.

Figure 2:
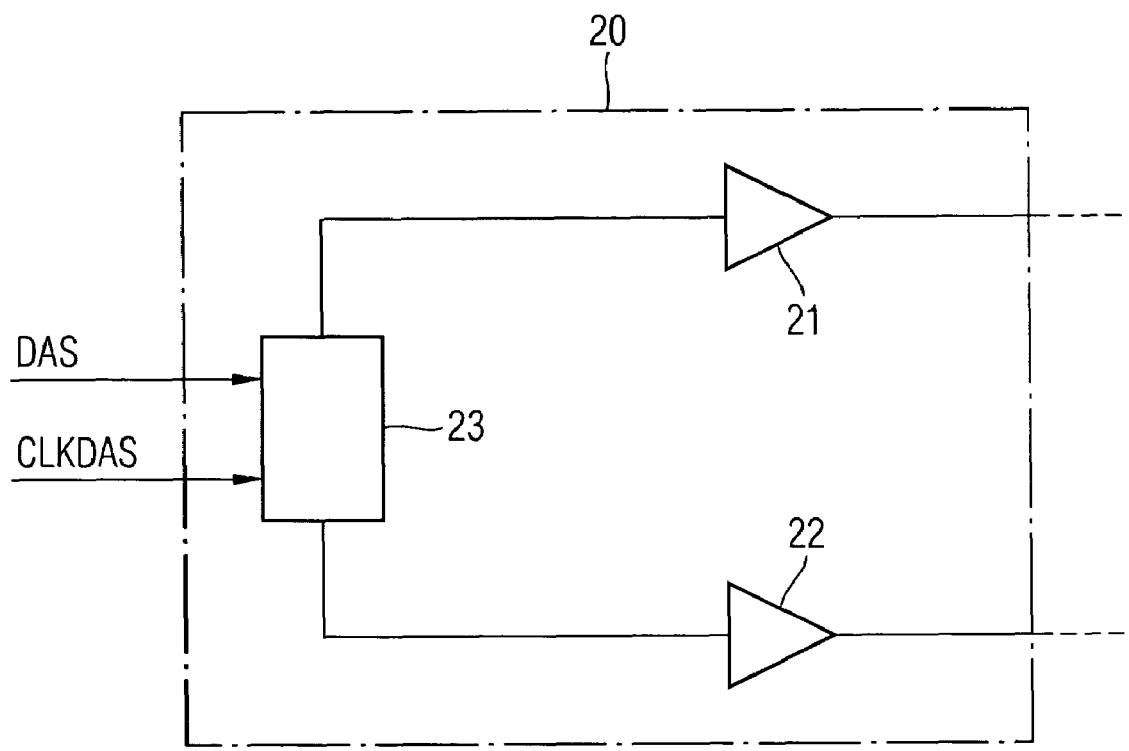
FIG. 2 shows a block diagram of a transmission circuit according to one embodiment of the invention.

FIG. 2 shows a transmission circuit 20 according to one preferred embodiment of the invention, which has a first driver circuit 21 for the data signal and a second driver circuit 22 for the reference signal. The driver circuits are connected to a control unit 23 which, via appropriate inputs, receives a data output signal DAS, which represents the data to be emitted, and a correspondingly associated clock signal CLK for the data output signal DAS. The control unit 23 drives the first driver circuit 21 such that the data output signal DAS is driven as a data signal via a first transmission line 3 and a corresponding reception circuit. The control unit 23 likewise drives the second driver circuit 22 such that a level change is produced at the output of the second driver circuit 22 when no level change takes place between two successive data bits of the data signal which is emitted from the first driver circuit 21. The potential of the first signal level of the data signal is preferably chosen such that it is lower than the possible potentials of the reference levels of the reference signal RS which is emitted via the second driver circuit 22. A potential of the second signal level of the data signal is chosen such that it is higher than the possible reference levels of the reference signal which is emitted from the second driver circuit 22.

Figure 3:
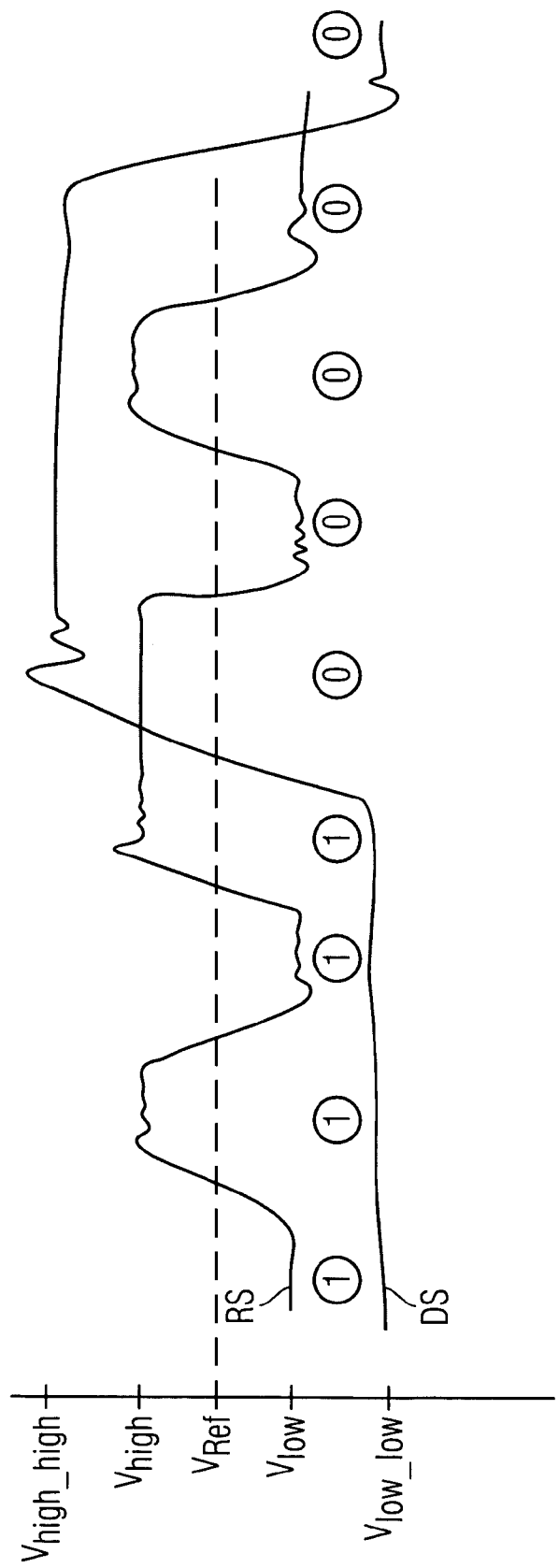
FIG. 3 shows a signal timing diagram with signal levels according to one method for transmission of data signals according to one embodiment of the invention.

FIG. 3 shows a signal timing diagram, which illustrates the signal levels of the data signal DS and of the reference signal RS during the transmission of a plurality of successive data bits with the state values indicated in the circles. The data signal DS has a first signal level for the first 4 data bits, which have the state "1", and this corresponds to a low potential $V_{low\_low}$. A second signal level of the data signal DS corresponds to a potential $V_{high\_high}$. The reference signal RS has a potential of $V_{low}$ for a first reference level, and a potential $V_{high}$ for a second reference level. Potentials $V_{high}$ and $V_{low}$ are within the range formed by the potentials $V_{high\_high}$ and $V_{low\_low}$ so that, when the data signal is at the first signal level, that is to say, at the potential $V_{low\_low}$, the voltage difference between the reference signal RS and the data signal DS is always positive, irrespective of the reference level that the reference signal RS is currently assuming. In the same way, the difference between the reference signal RS and the data signal DS is always negative when the data signal DS at the second signal level is at the potential $V_{high\_high}$, irrespective of the reference level that the reference signal RS is currently assuming.

Figure 4:
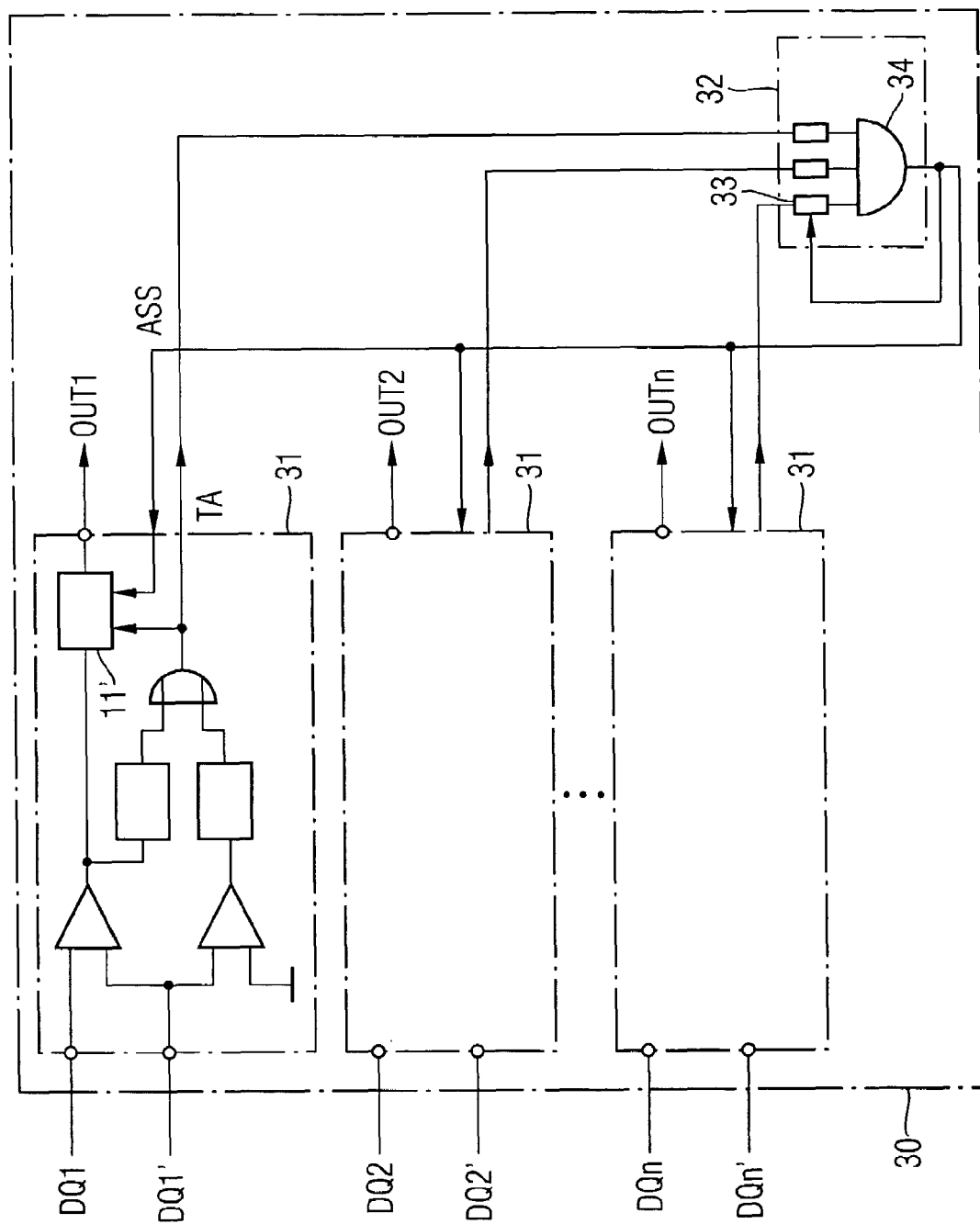
FIG. 4 shows a detail from a memory circuit having a plurality of reception circuits.

FIG. 4 illustrates a block diagram of a detail of an integrated memory circuit which has a plurality of reception circuits 31. The reception circuits 31 essentially correspond to the reception circuit 1 which is illustrated in FIG. 1. The reception circuits 31 differ only by the inclusion of the latch 11', which has a further input than the latch 11 in the embodiment shown in FIG. 1, to which an output control signal ASS can be applied. The output control signal ASS is used to instruct the latches in the reception circuits 31 to emit the previously received data item at their respective output OUT1, OUT2 . . . OUTn.

The reception circuits 31 furthermore have a clock output TA in order to emit the generated clock pulse CLK. The clock outputs TA are each connected to one input of a synchronization unit 32. The synchronization unit 32 is used essentially to generate the output control signal ASS as soon as a data item has been received in each of the reception circuits 31. In the illustrated embodiment, the synchronization unit 32 has further latches 33, which are each connected to the clock output of the reception circuits 31. When a clock pulse is present there, then the output of the respective latch 33 changes from a low level to a high level. The outputs of the latches 33 are connected to inputs of an AND gate 34. When all of the outputs of the latches 33 are at a high level, then the output of the AND gate 34 is likewise at a high level. A high level at the output 34 of the AND gate, which produces the output control signal ASS, results in the data in the latches 11' in the reception circuits 31 being emitted at the output of the reception circuits 31. In the same way, the generation of the output control signal ASS results in the latches 33 of the synchronization unit 32 being reset, so that the output control signal ASS changes from a high level to a low level. The output control signal ASS then returns from the low level to the high level only when the next data items have been received in each of the reception circuits 31.

According to an alternative embodiment, First-in First-out (FiFo) shift registers with a plurality of latches can be provided by the reception circuits instead of latches 11', and further FiFo shift registers can be provided instead of the further latches 33 in the synchronization unit 32, so that the correct association between the various data items DQ1, DQ2 ... DQn is maintained over a plurality of clock periods, even in the event of major delays in the individual data signals.

While the foregoing is directed to embodiments of the present invention, other and further embodiments of the invention may be devised without departing from the basic scope thereof, and the scope thereof is determined by the claims that follow.

What is claimed is:

1. A method for transmitting a data signal on a line pair having a first transmission line and having a second transmission line, comprising:
   applying to the first transmission line the data signal which represents the data to be transmitted by means of a sequence of first and second signal levels; and
   applying a reference signal on the second transmission line, wherein the reference signal changes between a first reference level and a second reference level only when a level change between the first signal level and the second signal level of the data signal is suppressed between two successive signal levels of the data signal on the first transmission line.

2. The method of claim 1, wherein potentials of the first and second reference levels of the reference signal are different than the potentials of the first and of the second signal levels.

3. The method of claim 2, wherein the potential of the first signal level of the data signal is lower than the potentials of the first and second reference levels of the reference signal.

4. The method of claim 2, wherein the potential of the second signal level of the data signal is higher than the potentials of the first and second reference levels of the reference signal.

5. A transmission circuit for transmitting a data signal on a line pair having a first transmission line and a second transmission line, comprising:
   a first driver circuit which applies the data signal to the first transmission line, wherein the data signal represents the data to be transmitted by means of a sequence of first and second signal levels;
   a second driver circuit which applies a reference signal having a first reference level and a second reference level to the second transmission line; and
   a control unit, which drives the second driver circuit such that the reference signal changes between the first and second reference levels only when a level change between the first and the second signal level is suppressed between two successive data items when the data signal is applied to the first transmission line.

6. The transmission circuit of claim 5, wherein the first driver circuit is configured to apply the data signal to the first transmission line with potentials of the first and second signal levels of the data signal,
   wherein the second driver circuit is configured to apply the reference signal to the second transmission line with potentials of the first and second reference levels of the reference signal, and
   wherein the potentials of the first and second reference levels of the reference signal are different than the potentials of the first and second signal levels.

7. The transmission circuit of claim 6, wherein the potential of the first reference level of the reference signal is lower than the potentials of the first and second signal levels and wherein the potential of the second reference level of the reference signal is higher than the potentials of the first and second signal levels.

8. The transmission circuit of claim 5, wherein the control unit receives a data output signal and a clock signal and drives the first driver circuit as a function of the data output signal, and wherein the control unit drives the second driver circuit to produce a level change in the reference signal only when the signal level of the data signal has the same signal level as the previous signal level.

9. An integrated memory circuit comprising one or more transmission circuits, each transmission circuit configured to transmit a data signal on a line pair having a first transmission line and a second transmission line, each transmission circuit comprising:
   a first driver circuit which applies the data signal to the first transmission line, wherein the data signal represents the data to be transmitted by means of a sequence of first and second signal levels;
   a second driver circuit which applies a reference signal having a first reference level and a second reference level to the second transmission line; and
   a control unit, which drives the second driver circuit such that the reference signal changes between the first and second reference levels only when a level change between the first and the second signal level is suppressed between two successive data items when the data signal is applied to the first transmission line.

10. The integrated memory circuit of claim 9, wherein the first driver circuit is configured to apply the data signal to the first transmission line with potentials of the first and second signal levels of the data signal,
    wherein the second driver circuit is configured to apply the reference signal to the second transmission line with potentials of the first and second reference levels of the reference signal, and
    wherein the potential of the first reference level of the reference signal is lower than the potentials of the first and second signal levels and wherein the potential of the second reference level of the reference signal is higher than the potentials of the first and second signal levels.

11. The integrated memory circuit of claim 9, wherein the control unit receives a data output signal and a clock signal and drives the first driver circuit as a function of the data output signal, and wherein the control unit drives the second driver circuit to produce a level change in the reference signal only when the signal level of the data signal has the same signal level as the previous signal level.

* * * * *